United States Patent [19]
Barrs

[11] Patent Number: 5,111,125
[45] Date of Patent: May 5, 1992

[54] AUTOMATIC MIRROR REPOSITIONING

[75] Inventor: John A. Barrs, Clawson, Mich.

[73] Assignee: United Technologies Automotive, Dearborn, Mich.

[21] Appl. No.: 716,045

[22] Filed: Jun. 17, 1991

[51] Int. Cl.⁵ .................. G05B 19/19; G02B 7/18
[52] U.S. Cl. .................. 318/603; 318/568.1; 318/466; 318/468; 318/569; 359/874; 359/876
[58] Field of Search ............... 318/560-636, 318/466, 467; 350/604, 634, 636, 637

[56] References Cited

U.S. PATENT DOCUMENTS

| | | | |
|---|---|---|---|
| 4,698,571 | 10/1987 | Mizuta et al. | 318/466 X |
| 4,727,302 | 2/1988 | Mizuta et al. | 318/466 X |
| 4,986,646 | 1/1991 | Hamamoto et al. | 318/466 X |
| 5,033,835 | 7/1991 | Platzer, Jr. | 350/637 |

Primary Examiner—Paul Ip

[57] ABSTRACT

A "memory" mirror system having a mirror 19 mounted within convex-shaped mirror movement boundaries, two constant speed motors 16,18 each controlling an axis of mirror movement, position feedback signals 26,28 from each motor, push button inputs 12 and an electronic controller 10, is provided with automatic mirror repositioning that drives the mirror from a start position to a "memory" position in minimum time without colliding with any mirror movement boundaries by turning ON the motor, in the direction of the target, whose movement axis is the greatest distance from the target and turning ON the other motor, in the direction of the target, if the direction toward the target is also toward the center of the mirror movement pattern (i.e., away from the nearest boundary).

1 Claim, 3 Drawing Sheets

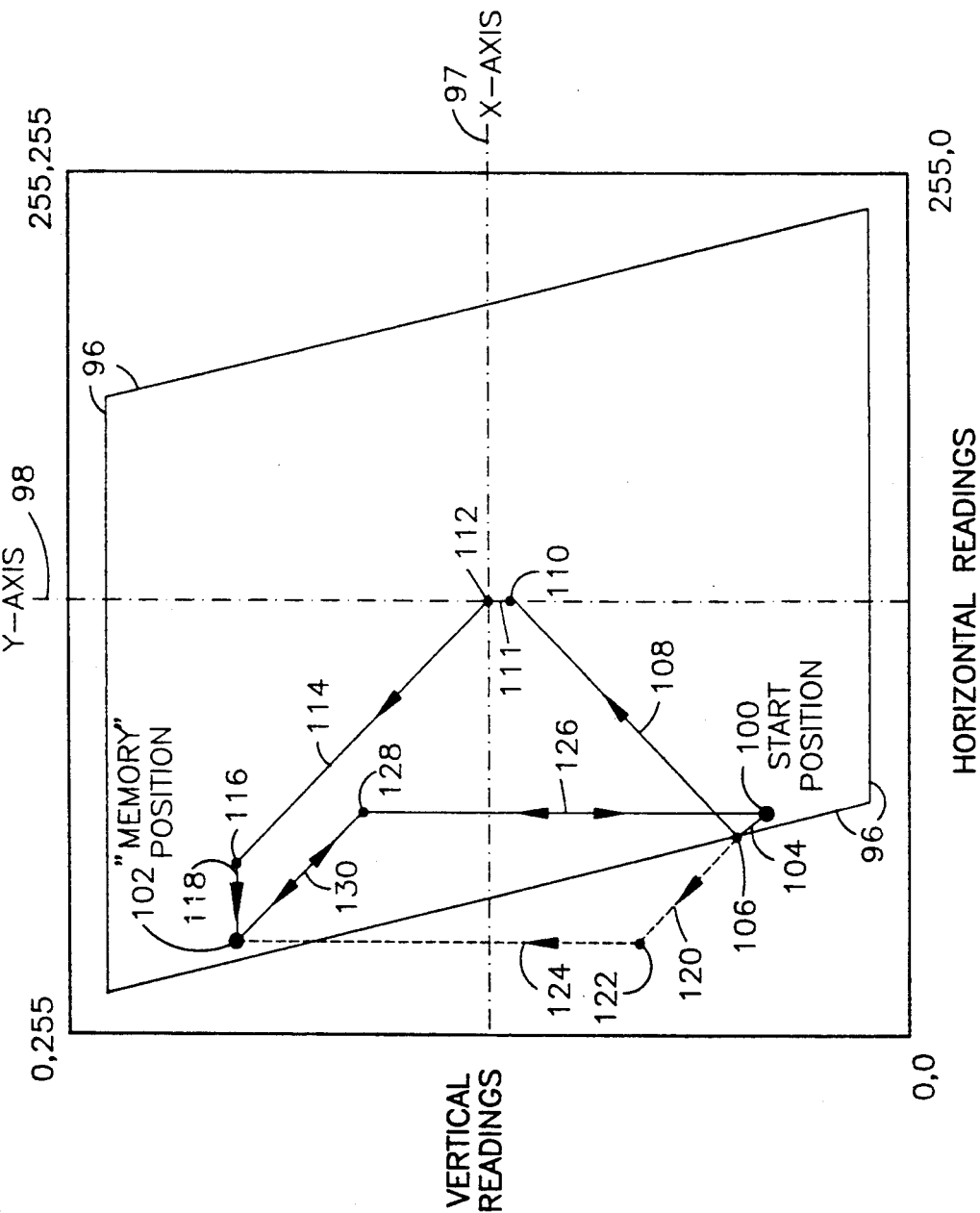

AUTOMATIC MIRROR REPOSITIONING

TECHNICAL FIELD

This invention relates to automatic repositioning (memory) mirrors and more particularly to an improved technique for driving a mirror from a present position to a previous (stored) position.

BACKGROUND ART

It has become common practice to fit certain vehicles with one or more "memory" mirrors, i.e., a mirror for which one or more desired positions are encoded (stored) in memory and then "remembered" (retrieved from memory). Memory mirrors provide automatic repositioning of a vehicle mirror, typically initiated by a primary driver, when the mirror has been moved out of its desired position by, say, a second driver. For example, first the primary driver sets a desired position for a mirror and stores the setting. Then, the second driver manually changes the mirror position. When the primary driver returns and pushes a memory push-button switch, the mirror automatically returns to its original (memory) position.

Typically, memory mirror systems comprise known electronic hardware, e.g., two motors, one for up/down mirror movement about a "horizontal" axis and another for left/right mirror movement about a "vertical" axis, each motor having analog voltage position feedback, driven by an electronic controller comprising: a 4-bit micro-controller, motor drivers, analog-to-digital (A/D) converters, and "on chip" memory, such as that described in U.S. Pat. No. 4,929,878. Mirror movement is typically achieved by mounting a mirror to a fixed position ball joint, at the center of the mirror, thereby allowing mirror movement in all directions, and pushing/pulling an off-center point on the mirror using a motor connected to the mirror by a "rack and pinion" arrangement. The "rack and pinion" converts clockwise or counter-clockwise (CW/CCW) rotational motion of the motor output shaft into translational motion of a rod (or "rack") using a gear mounted to the motor output shaft and a rod having notches which mesh with the gear and allow the rod to be driven thereby. For example, for left/right mirror movement, a first motor drives a first rod having one end attached to the mirror at a point along a horizontal line, a known distance to the right or left of the center of the mirror. For up/down mirror movement, a second motor drives a second rod having one end attached to the mirror at a point along a vertical line (perpendicular to the horizontal line), a known distance above or below the center of the mirror. The position of the mirror is typically described by two coordinates, one for the position of each rod. Position sensing of each rod (i.e., position feedback) is provided by a potentiometer, having a wiper shaft geared to the motor output shaft, which provides a variable voltage to the electronic controller.

The motors are typically bidirectional (CW or CCW), DC, constant speed motors, and are operated either individually or together, having equal speeds when turned ON. When a motor is turned ON it may be run either CW or CCW, which translates into left/right mirror movement by one motor and up/down mirror movement by the other motor (as described hereinbefore). Thus, the mirror has eight degrees of freedom; up, down, right, left, up left 45°, up right 45°, down left 45°, down right 45°.

A memory mirror system includes an algorithm for driving the mirror from a starting position to a previously stored (memory) position. Previous algorithms, e.g., the algorithm described in the aforementioned patent, start with both motors running (i.e., motion at a 45° angle from the present position). Viewing the starting mirror position as the origin (center) of an orthogonal coordinate system, the aforementioned algorithm first drives the mirror at 45° in the quadrant where the destination is located until the mirror position is along either a horizontal or vertical line from the destination, then turns OFF the appropriate motor allowing the remaining running motor to bring the mirror to the desired position (destination).

Memory mirrors are typically mounted within a cavity or housing that provides a limited amount of mirror movement. If the mirror hits a boundary (also known as a stop or obstruction) the mirror travel stops. The mirror movement boundaries are typically a known convex shape having no concave edges, such as a circle, an oval, or a parallelogram. Also, the mirror is typically a known shape such as a circle, an oval, a half oval, or a parallelogram but is not necessarily the same shape as the boundaries it is mounted within. Using existing mirror positioning algorithms, it is possible to hit a boundary, e.g., when certain starting and ending points are near a boundary, thereby requiring the algorithm to detect when a boundary is hit. Boundary detection is typically done by calculating the rate of change of motor speed with time and comparing it to a known predetermined value, e.g., 0 degrees/second. Furthermore, once a boundary is hit, the mirror is typically driven to a default position (such as the origin (0,0) of the mirror movement area) using the same positioning algorithm and, once at the origin, a second attempt is made to drive the mirror to the desired position. Driving to a default position increases the time for the mirror to reach the "memory" position by approximately 2 to 3 seconds, and detecting boundary collisions requires additional complexity of the repositioning algorithm which translates into increased memory space and slower execution time.

DISCLOSURE OF THE INVENTION

Objects of the invention include provision of automatic repositioning of a mirror mounted within mirror movement boundaries (stops) which avoids hitting such boundaries, and which provides the fastest possible travel time between two points with two constant speed motors.

According to the present invention, a first motor drives the mirror along a first axis (e.g., the x-axis for left/right movement) in a direction toward the target position if either the distance along the x-axis to the target (X-distance) is greater than or equal to the distance along a y-axis to the target (Y-distance) or such direction toward the target is also toward the origin (i.e., away from the nearest boundary). Otherwise, the first motor is OFF. Similarly, a second motor drives the mirror along a second axis (e.g., the y-axis for up/down movement) in a direction toward the target if either Y-distance is greater than or equal to the X-distance or such direction toward the target is also toward the origin (i.e., away from the nearest boundary). Otherwise, the second motor is OFF. A motor never drives the mirror in a direction away from the target. Thus, the invention turns ON a motor if the distance to the target for that motor is not less than the distance to the target for the other motor or if the direction toward the target is also toward the origin.

The invention represents a significant improvement over previous techniques by providing continuous travel towards the target (memory) position of the mirror without hitting any mirror movement boundaries, thereby providing the fastest mirror travel time possible using two constant speed motors, independent of the starting mirror position. This technique simplifies existing logic by not detecting boundary collisions and not driving the mirror to a default position, thereby saving memory space, which allows lower cost micro-controllers with on-chip memories to be used. Smaller and simpler logic yields faster execution time, thereby allowing a faster update rate and, thus, quicker control response time.

The foregoing and other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 3 is a diagram illustrating the mirror movement boundaries and movement paths under a prior art algorithm when it encounters a mirror movement boundary and when no mirror movement boundary is encountered, and, in accordance with the present invention, showing boundary avoidance, for a mirror having a parallelogram boundary configuration.

BEST MODE FOR CARRYING OUT THE INVENTION

Figure 1:
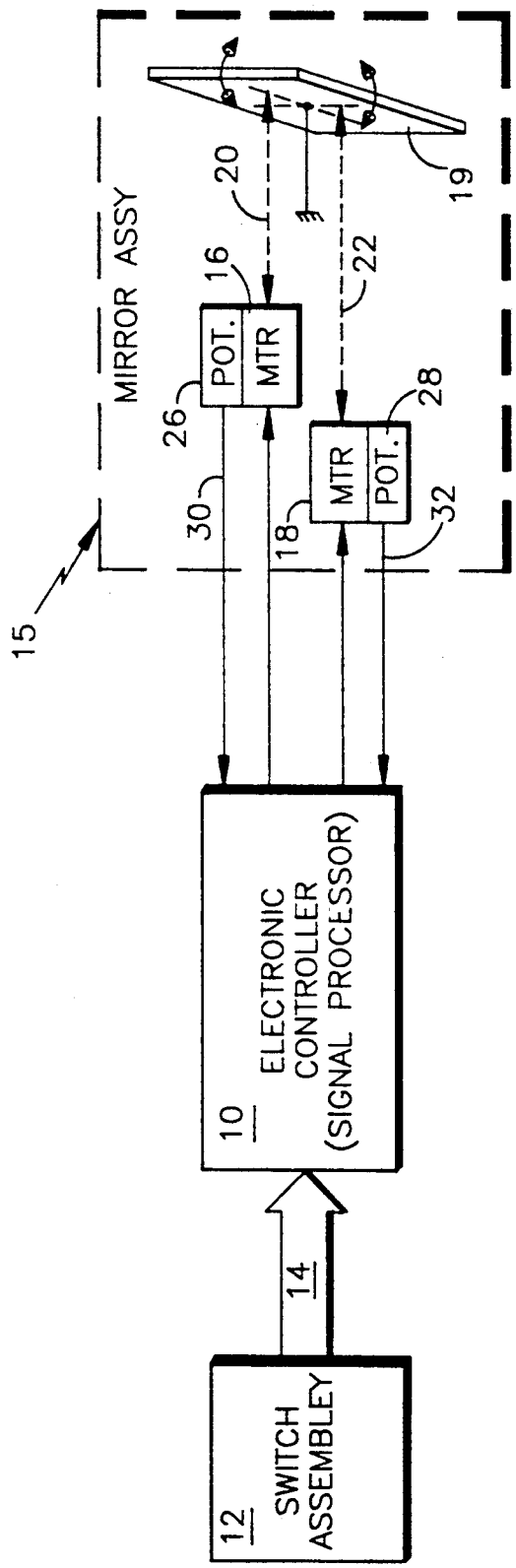
FIG. 1 is a schematic block diagram of a prior art hardware configuration.

Referring to FIG. 1, the prior art hardware configuration for a typical automatic mirror repositioning ("memory" mirror) system, such as that described in the aforementioned patent typically comprises an electronic controller (or signal processor) 10, comprising the aforementioned known components, which accepts inputs from a switch assembly 12 comprising a plurality of push-buttons, i.e., a set push-button, two memory push-buttons, a left/right/neutral toggle switch and a joy stick or a four push-button pad on the lines 14.

The signal processor 10 provides output signals to and accepts input (feedback) signals from a mirror assembly 15. The signal processor 10 typically drives two motors, 16,18 which control a mirror 19 in a known way. For example, a first motor 18 controls left/right (horizontal) mirror movement and a second motor 16 controls up/down (vertical) mirror movement. Each motor is mechanically linked by known means 20,22, e.g., a rack and pinion arrangement, to the mirror 19.

Each motor output shaft is geared to a position sensing device 26,28 which provides an analog feedback voltage signal on lines 30,32 respectively to the signal processor 10, e.g., 0 to 5 volts corresponds to min. to max mirror position for a given direction. The signal processor 10 converts each analog feedback voltage signal to a series of digital bits using an eight bit analog to digital (A/D) converter, i.e., 0 to 255 A/D counts corresponds to 0 to 5 volts from the feedback sensors. One position sensor provides a vertical position signal and the other provides a horizontal position signal. The granularity (resolution) of the motor position feedback is within 1 bit of the A/D converter.

The two readings from the position sensors make up two coordinates for the position of the mirror. The position feedback A/D counts can be viewed as an orthogonal coordinate system having an x-axis and a y-axis and having as its origin (0,0), the equivalent of the A/D counts (128,128), i.e., half the scale of each motor's full range of travel. For example, if horizontal mirror movement (left/right) is considered the x-axis and vertical mirror movement (up/down) is considered the y-axis, a reading of 150 A/D counts from the horizontal motor and 200 A/D counts from the vertical motor, would correspond to coordinates of: x=22, y=72.

Figure 2:
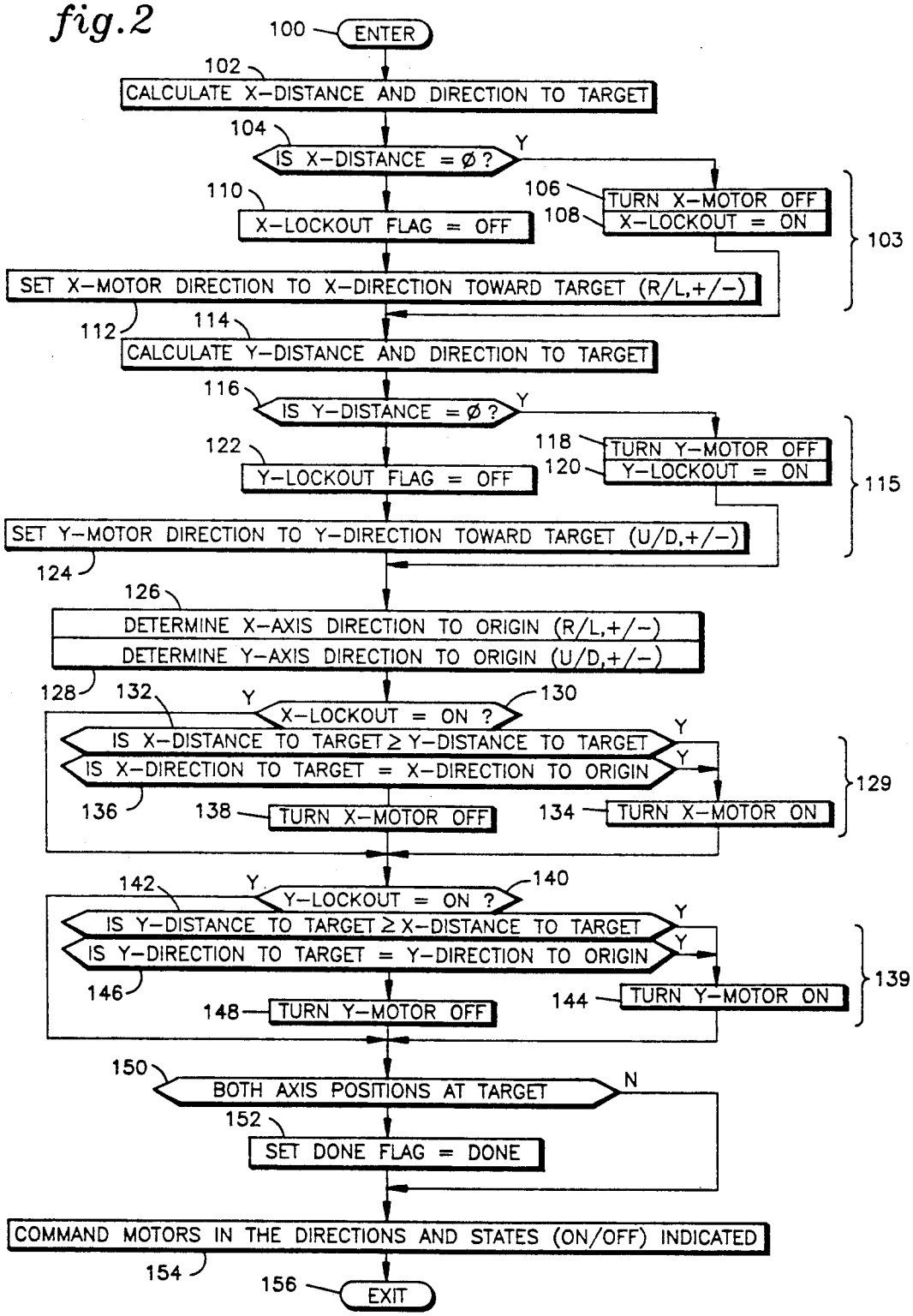
FIG. 2 is a logic flow diagram illustrating the steps of the algorithm in accordance with the present invention.

Referring to FIG. 2, the "memory" mirror automatic repositioning routine begins at an entry point 100, and a step 102 calculates the distance and direction from the current position to the target (memory) position in the x-axis direction (X-distance). The X-distance is calculated by subtracting the current X-motor A/D feedback counts from the target position X coordinate counts stored in memory. Then a series of steps 103 determines which direction (CW/CCW) to run the X-motor (i.e., the motor that controls R/L mirror motion along the X-axis). A test 104 determines if the X-distance to the target is equal to 0 (which is achievable because the resolution of the motor position feedback is within 1 bit of the A/D converter). If it is, the current position lies solely along a vertical line, parallel to the y-axis, from the target, meaning no X-motor motion is required. Thus, a step 106 sets a flag to turn the X-motor OFF and a step 108 sets an X-lockout flag to the ON state. The X-lockout flag is used to prevent the logic from turning ON the X-motor this pass through the logic. If the X-distance in test 104 is not 0, a step 110 resets the X-lockout flag equal to the OFF state, thereby allowing the logic to turn ON the X-motor (if subsequent steps so desire). Then a step 112 sets the direction along the x-axis (X-direction) the X-motor must turn (CW/CCW) to move the mirror right/left (R/L) from the current position to the target position, by examining the sign (+/−) of the subtraction result of the distance calculation in the step 102. For example, if the sign of the subtraction result of the step 102 is "+", the motor must move the mirror to the right (R).

Next, a step 114 calculates the distance and direction from the current position to the target position in the y-axis direction (Y-distance). Then a series of steps 115 determines the status of a Y-lockout flag and determines which direction to run the Y-motor which moves the mirror up/down (U/D), in a similar manner as steps 103. A test 116 determines if the Y-distance to the target is equal to 0. If it is, the current position lies solely along a horizontal line, parallel to the x-axis, from the target, meaning no Y-motor motion is required. Thus, a step 118 sets a flag to turn the Y-motor OFF and a step 120 sets a Y-lockout flag to the ON state. The Y-lockout flag is used to prevent the logic from turning ON the Y-motor this pass through the logic. If the Y-distance to the target is not equal to 0, then a step 122 sets the Y-lockout flag to the OFF state, thereby allowing the logic to turn ON the Y-motor (if subsequent steps so desire). Then a step 124 sets the direction of the Y-motor to equal the Y-direction (U/D) from the current position to the target, by examining the sign (+/−) of the subtraction result of the Y-distance calculation in the step 114. For example, if the sign of the subtraction result of the step 114 is "+", the motor must move the mirror up (U).

The routine then determines the direction from the current position to the origin. A step 126 determines the X-direction to the origin (R/L) by subtracting the X-motor position feedback from 127.5 and examining the sign (+/−) of the result (the origins are placed at a position corresponding to 127.5 A/D counts, so a zero result cannot be achieved). Then a step 128 determines the Y-direction (U/D) to the origin by subtracting the Y-motor position feedback from 127.5 and examining the sign (+/−) of the result.

Next, a series of steps 129 determines if the X-motor should be turned ON. A test 130 determines if the X-lockout flag is set to the ON state. If the X-lockout flag is not ON i.e., is in the OFF state, a test 132 determines if the X-distance to the target (determined in step 102) is greater than or equal to the Y-distance to the target (determined in step 114). If it is, a step 134 sets a flag to turn the X-motor ON and bypasses the steps 136,138. Otherwise, a test 136 determines if the X-direction from the current position toward the target (determined in step 102) is the same as the X-direction from the current position toward the origin (determined in step 126). If the directions in the test 136 are the same, the step 134 sets a flag to turn the X-motor ON. Otherwise, a step 138 sets a flag to turn the X-motor OFF. If the X-lockout flag is in the ON state, the result of the test 130 is affirmative and the logic 129 to turn ON the X-motor is bypassed.

Next, a series of steps 139 determines if the Y-motor should be turned ON. A step 140 determines if the Y-motor lockout flag is set to the ON state. If it is not, a test 142 determines if the Y-distance to the target (determined in step 114) is greater than or equal to the X-distance to the target (determined in step 102). If it is, a step 144 sets a flag to turn the Y-motor ON and the steps 146,148 are bypassed. Otherwise, a test 146 determines if the Y-direction from the current position toward the target (determined in step 114) is the same as the Y-direction from the current position toward the origin (determined in step 128). If the directions in test 146 are the same, the step 144 sets a flag to turn the Y-motor ON. Otherwise, a step 148 sets a flag to turn the Y-motor OFF. The tests 136,146, insure that a second motor is only turned ON when the direction to the target, along that motor's axis, is also toward the origin (i.e., away from the boundary), thereby always avoiding the mirror movement boundaries when two motors are running. If the Y-lockout flag tested in step 140 is in the ON state, the aforementioned logic 139 that turns the Y-motor ON, is bypassed.

Next, a test 150 determines if both axes feedback positions are at the target, i.e., the X-distance to the target and Y-distance to the target are both equal to 0. If they are, a step 152 sets a DONE flag to 1. The test 150 may also be performed by testing if both lockout flags are set to the ON state. If one or both of the axes feedback positions is not at the target, the step 152 is bypassed. Then a step 154 commands the motors to the desired directions and states (ON/OFF) as determined by the aforementioned logic and the program exits from the point 156.

As discussed hereinbefore, typically a driver presses the "memory" push-button to automatically reposition the mirror from its current position to a previously stored "memory" position. The signal processor, as is known, monitors the "memory" pushbutton discrete input signal and, when it is depressed, initiates the repositioning routine (FIG. 2) at a known real-time invocation rate, e.g., 3.125 milliseconds. The signal processor also monitors the DONE flag from the repositioning routine and, when it is set to the DONE state, the mirror has reached the "memory" position and the repositioning routine is no longer called until the "memory" push-button is again depressed.

Referring now to FIG. 3, a mirror with a parallelogram boundary pattern 96, superimposed on an x-axis 97 and y-axis 98, is shown with a start position 100 and a target position 102. The aforementioned prior art algorithm drives the motor along the path 104 initially at a 45° angle to the vertical because the target position 102 is in the upper left quadrant of an orthogonal coordinate system having its origin at the start position. The mirror is driven along a path 104 until it hits the mirror movement boundary 96 at a point 106. When the boundary collision is detected, the mirror is driven along a path 108 (at a 45° angle) to a point 110 and then driven vertically along a path 111 to bring the mirror to a default position, e.g., the origin 112 (0,0). Whenever an boundary is hit, the logic sets the origin 112 as a temporary target position (temporarily replacing the "memory" position 102). Once the origin 112 is reached, the logic re-loads the "memory" position 102 as its target and, because the point 102 is in the upper left quadrant of an orthogonal coordinate system having its origin at the origin (0,0), it turns ON both motors and drives the mirror position along a line 114 to a position 116 that is solely along the X-axis 97 direction (i.e., a horizontal line) from the target position. The logic then turns OFF the Y-motor and allows the X-motor to drive the mirror position along the line 118 to the memory position 102.

Without the boundary 96 constraint, starting at the point 100, the prior art algorithm would first command both motors ON, driving the mirror position from the point 100 along the line 104 and the line 120 to a point 122, where the position is solely along the Y-axis direction from the "memory" position 102. Then the logic turns OFF the X-motor, thereby allowing the remaining motor to drive the mirror to the "memory" position 102 along the line 124.

Again starting at the point 100, the algorithm of the invention drives the mirror position from the point 100 along the line 126, moving the mirror in the UP (U) direction, i.e., the logic turns ON only the Y-motor. This occurs because the Y-distance to the target is greater than the X-distance to the target, thus, the result of the test 142 (FIG. 2) is affirmative. For the X-motor, the X-distance to the target is not greater than or equal to the Y-distance to the target, so the result of test 132 is NO, and the logic then performs test 136. The X-direction (L) to the target is not the same as the X-direction (R) to the origin, thus, the result of the test 136 (FIG. 2) is NO and the step 138 sets a flag to turn the X-motor OFF. The logic will continue to command the same output states, i.e., X-motor=OFF and Y-motor =ON, each time the routine (FIG. 2) is called, until the position reaches a point 128, where the X-distance and Y-distance from the "memory" position 102 are the same. Thus, at the point 128, the logic turns ON the X-motor because the result of the test 132 is affirmative, thereby driving the mirror position at a 45 degree angle to the X-axis along a line 130. The logic will continue to command both motors ON until both feedback axes positions equal the "memory" position 102 coordinates.

When the memory position is reached, both motors are turned OFF by the steps 106,118, the result of the test 150 (FIG. 2) is true, the DONE flag is set to 1, and the program is exited.

If the start position were at the point 102 and the target position were at the point 100, the algorithm would follow the same return path, again avoiding the boundary 96. Starting at the point 102, the Y-distance to the target is greater than the X-distance to the target so the result of the test 142 (FIG. 2) is affirmative and the Y-motor is turned ON. For the X-motor, the X-direction (R) to the origin is the same as the X-direction (R) to the target 100, so the result of the test 136 is affirmative and the X-motor is turned ON. Consequently, the mirror travels at a 45 degree angle to the vertical until the point 128 is reached, where the X-distance to the target is 0. At the point 128, the result of test 104 is affirmative, the X-motor is turned OFF (FIG. 2, step 106), and the X-lockout flag is set to the ON state (FIG. 2, step 108), thereby precluding the X-motor from being turned ON. Thus, the Y-motor drives the mirror position along the line 126 to the position 100.

Although the invention has been described as driving only one mirror, it should be understood that the invention may be used to automatically reposition as many mirrors as the hardware can support. The primary constraints are the number of motors capable of being driven, the number of inputs to the A/D converter, and the speed of the micro-controller. Furthermore, if desired, the group of steps 103 (FIG. 2, setting X-direction and X-lockout flag for X-motor) may be performed in a loop (one pass for each mirror) to make the control of multiple mirrors more efficient. The same may be done for the groups of steps 115,129,139 (FIG. 2).

Also, there is no required order of the groups of steps 103,115,129,139, except that the data required for a given step be obtained prior to performing that step. For example, the logic 129 may be placed after the logic 139, or the logic 103 may be placed after the logic 115.

Furthermore, although the invention has been illustrated as being implemented with purely convex-shaped mirror movement boundaries (having no concave surfaces, i.e., a straight line joining the start and "memory" positions must lie along or within the boundary), the invention will work equally well with concave-shaped boundaries if the mirror shape is known and temporary, intermediate target positions are used to avoid the concave obstructions.

Still further, instead of using a "rack and pinion" arrangement to connect the motor to the mirror, any other driving mechanism may be used. Also, although the movement axes are described as being orthogonal, the invention will work equally well with non-orthogonal axes because the position feedback signals will always reflect the current mirror position.

Also, instead of using a potentiometer geared to the output shaft of the motor as the mirror position feedback sensor, any feedback device for measuring the position of the mirror that is related to a given motor's axis of movement may be used.

Although the invention has been described and illustrated with respect to exemplary embodiments thereof, it should be understood by those skilled in the art that the foregoing and various other changes, omissions and additions may be made without departing from the spirit and the scope of the invention.

I claim:

1. An automatic mirror repositioning system having at least one mirror mounted within mirror movement boundaries, there being an origin at the center of mirror movement, comprising:

a first motor, connected to the mirror, controlling a first axis of mirror movement;

a second motor, connected to the mirror, controlling a second axis of mirror movement;

a first position means, responsive to the position of the mirror along said first axis, for providing a first feedback signal indicative of a current position of the mirror along said first axis;

a second position means, responsive to the position of the mirror along said second axis, for providing a second feedback signal indicative of a current position of the mirror along said second axis; and signal processing means, for providing signals indicative of a predetermined target position of the mirror and responsive to said first and said second feedback signals, for causing said first motor to drive said mirror toward said predetermined target position when either the distance along said first axis from said current position to said target position is not less than the distance along said second axis from said current position to said target position or the direction along said first axis from said current position toward said target position is also toward said origin, and for causing said second motor to drive said mirror toward said target position when either the distance along said second axis from said current position to said target position is not less than the distance along said first axis from said current position to said target position or the direction along said second axis from said current position toward said target position is also toward said origin.

* * * * *